United States Patent
Han et al.

(10) Patent No.: US 11,941,436 B1
(45) Date of Patent: Mar. 26, 2024

(54) RETIMER WITH HOST-INTERACTIVE DATA LOGGING ENGINE

(71) Applicant: Astera Labs, Inc., Santa Clara, CA (US)

(72) Inventors: Ken (Keqin) Han, San Jose, CA (US); Casey Morrison, San Jose, CA (US); Charan Enugala, Newark, CA (US); Pulkit Khandelwal, Cupertino, CA (US); Vikas Khandelwal, San Jose, CA (US)

(73) Assignee: Astera Labs, Inc., Santa Clara, CA (US)

( * ) Notice: Subject to any disclaimer, the term of this patent is extended or adjusted under 35 U.S.C. 154(b) by 521 days.

(21) Appl. No.: 17/240,230

(22) Filed: Apr. 26, 2021

Related U.S. Application Data

(60) Provisional application No. 63/015,456, filed on Apr. 24, 2020.

(51) Int. Cl.
*G06F 9/54* (2006.01)
*G06F 9/30* (2018.01)
*G06F 9/38* (2018.01)
*G06F 9/48* (2006.01)

(52) U.S. Cl.
CPC ........ *G06F 9/4881* (2013.01); *G06F 9/30036* (2013.01); *G06F 9/3005* (2013.01); *G06F 9/3836* (2013.01); *G06F 9/544* (2013.01)

(58) Field of Classification Search
CPC ........ G06F 1/329; G06F 9/4843; G06F 9/542; G06F 16/1734; H04L 41/06; H04L 41/0604
See application file for complete search history.

(56) References Cited

U.S. PATENT DOCUMENTS 10,740,002 B1 * 8/2020 Aden .................... G06F 3/0659
2018/0300083 A1 * 10/2018 Volos ................... G06F 3/0656

* cited by examiner

*Primary Examiner* — Andy Ho
(74) *Attorney, Agent, or Firm* — Charles Shemwell

(57) ABSTRACT

An integrated-circuit retimer selectively logs information corresponding to mission-mode data, received and transmitted via counterpart high-bandwidth data interfaces, in real-time and in accordance with contents of a logging control storage written by an external component during retimer run time.

21 Claims, 5 Drawing Sheets

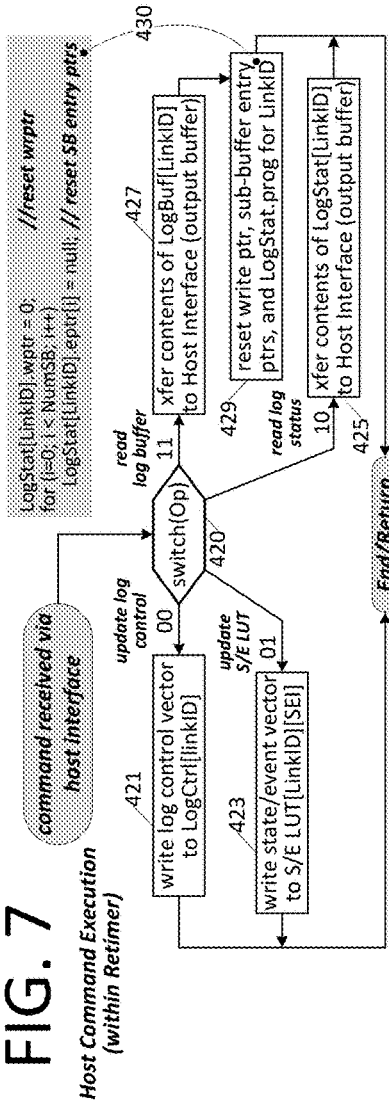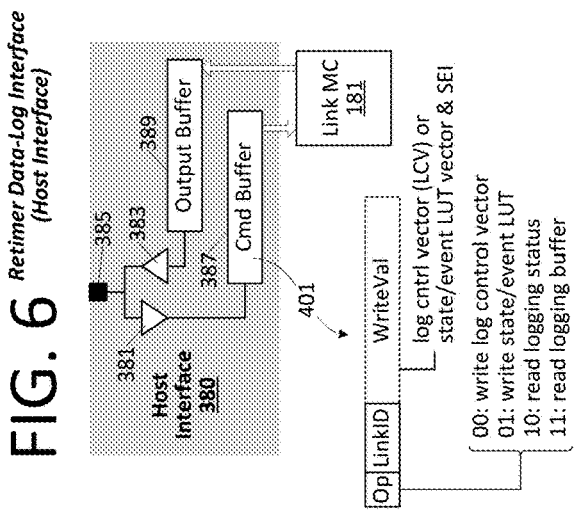

FIG. 11

| DOWNSTREAM LOG, LINK 0 | |
|---|---|
| 0.0 ms | RESET START |
| | (detailed message) |
| | (detailed message) |
| 0.1 ms | RESET WAIT COMPLETE |
| 0.8 ms | RESET COMPLETE |
| | (detailed message) |
| | ... |
| | (detailed message) |
| 0.0 ms | RX DETECT START |
| | (detailed message) |
| | (detailed message) |
| 1.1 ms | RX DETECT COMPLETE |
| 0.0 ms | WAIT RX VALID |
| | (detailed message) |
| | ... |
| | (detailed message) |
| 35.2 ms | RX VALID DETECTED |
| 0.0 ms | READY TO DESKEW |
| | (detailed message) |
| 0.3 ms | DESKEW FINISH |
| 0.0 ms | READY TO FORWARD |
| | (detailed message) |
| | (detailed message) |
| 0.0 ms | FORWARD |
| | (detailed message) |
| | ... |
| | (detailed message) |
| 22.8 ms | DETECTED ELECTRICAL IDLE |

| UPSTREAM LOG, LINK 0 | |
|---|---|
| 0.0 ms | RESET START |
| | (detailed message) |
| | (detailed message) |
| 0.1 ms | RESET WAIT COMPLETE |
| 0.7 ms | RESET COMPLETE |
| | (detailed message) |
| | ... |
| | (detailed message) |
| 0.0 ms | RX DETECT START |
| | (detailed message) |
| 1.0 ms | RX DETECT COMPLETE |
| 0.0 ms | WAIT RX VALID |
| | (detailed message) |
| | ... |
| | (detailed message) |
| 10.4 ms | RX VALID DETECTED |
| 0.0 ms | READY TO DESKEW |
| | (detailed message) |
| 0.4 ms | DESKEW FINISH |
| 0.0 ms | READY TO FORWARD |
| | (detailed message) |
| | (detailed message) |
| 0.0 ms | FORWARD |
| | (detailed message) |
| | ... |
| | (detailed message) |
| 20.1 ms | DETECTED ELECTRICAL IDLE |

RETIMER WITH HOST-INTERACTIVE DATA LOGGING ENGINE

CROSS REFERENCE TO RELATED APPLICATIONS

This application hereby incorporates by reference and claims the benefit of U.S. provisional application No. 63/015,456 filed Apr. 24, 2020.

DRAWINGS

The various embodiments disclosed herein are illustrated by way of example, and not by way of limitation, in the figures of the accompanying drawings and in which like reference numerals refer to similar elements and in which:

FIG. 6 illustrates an exemplary host interface implemented within the FIG. 1 retimer to enable host read/write access to the logging control/status data structures and logging buffer;

FIG. 7 illustrates an exemplary sequence of operations executed within the retimer logging engine in response to incoming host commands;

FIG. 8 illustrates a sequence of operations that may be implemented within a host-side controller to manage data logging within the retimer and retrieve logged data;

FIG. 9 illustrates exemplary host-side parsing (unpacking) of entries stored in a batch-mode data log obtained from the retimer;

FIG. 10 illustrates an exemplary host-side parsing/unpacking of entries stored in a continuous-mode data log obtained from the retimer; and FIG. 11 illustrates an exemplary retimer event history reconstructed by the host based on information logged within the retimer per host-specified logging control vector and transmitted via the host interface in response to host readout request/command.

DETAILED DESCRIPTION

In various embodiments herein an integrated-circuit retimer selectively logs information corresponding to mission-mode data, received and transmitted via counterpart high-bandwidth data interfaces, in real-time and accordance with contents of a logging control storage written by an external component during retimer run time. In a number of embodiments, the logging control storage is exposed, together with real-time logging status, to the external component ("host" component) via a relatively low-bandwidth interface, enabling information-logging focus to be shifted to successively selected events/conditions without compromising peak mission-mode data throughput or over-taxing critical-path control circuitry within the retimer. In those and other implementations, the host-writable logging control storage stores one or more logging control vectors in which respective fields provide, for example and without limitation, the following control features:

- selectively enabled information logging with respect to various aggregated-lane data links that traverse the retimer via the counterpart high-bandwidth interfaces;
- selectively enabled information logging with respect to counterpart segments, upstream and downstream, of any data link that traverses the retimer;
- selectively enabled information logging with respect to mission-mode data flowing in a given direction (upstream and/or downstream) within any data link that traverses the retimer;
- specification, as a trigger for information logging, of one or more host-defined combinations of operational states (e.g., of a specified data link and/or retimer-implemented state machine(s)) and/or events;
- selectively enabled overflow within a fixed-capacity logging buffer to enable/disable continuous (temporally unlimited) information logging.

Figure 1:
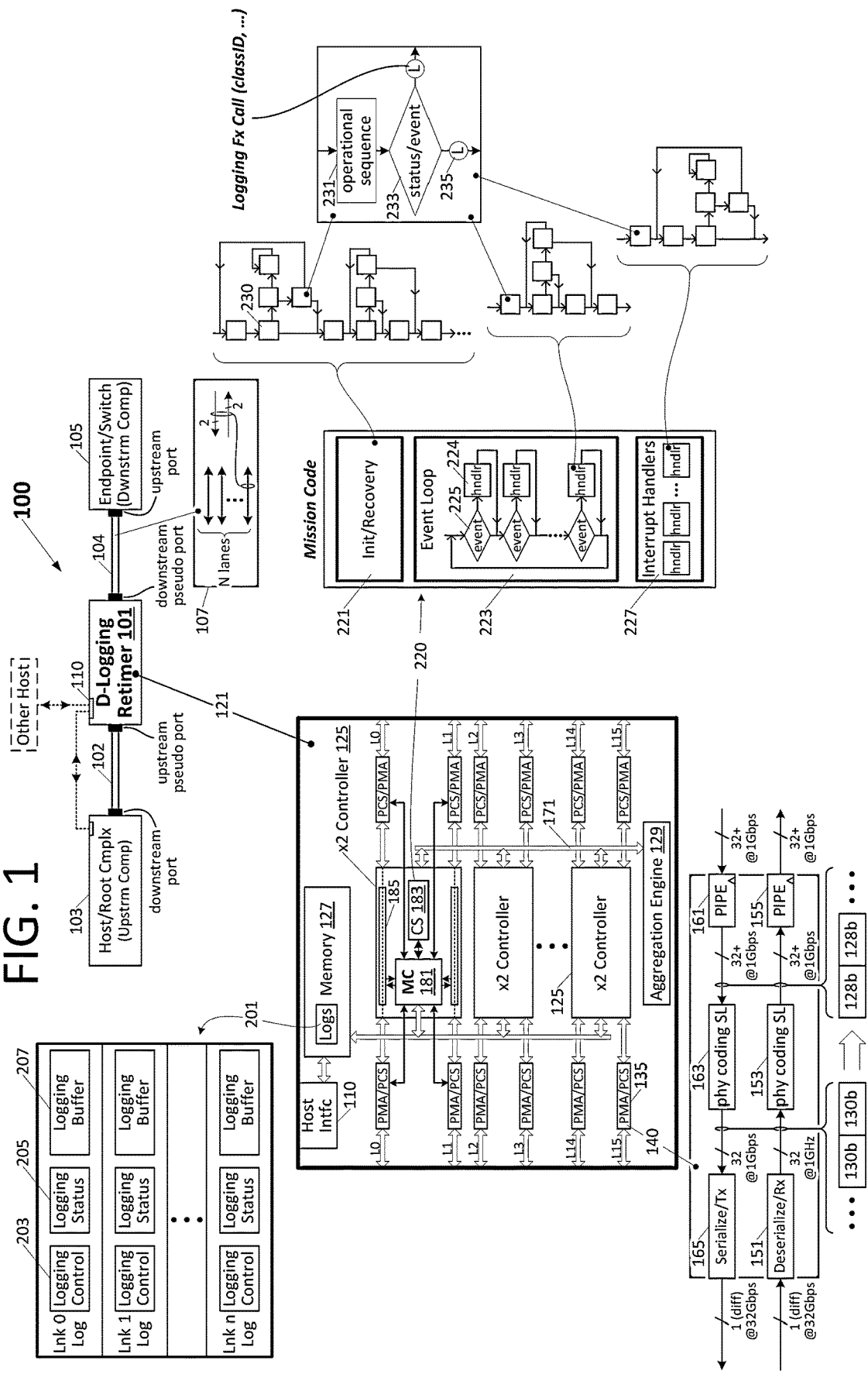
FIG. 1 illustrates an embodiment of a synchronous signaling system having a data-logging retimer coupled between upstream and downstream components via respective channel-count-configurable signaling paths.

FIG. 1 illustrates an embodiment of a synchronous signaling system 100 having a data-logging retimer 101 coupled between upstream and downstream components 103, 105, via respective channel-count-configurable signaling paths 102 and 104. Retimer 101 extends the viable signaling path length between the upstream and downstream components by applying timing information and digital data recovered from inbound symbol streams (sourced by either of components 103, 105 and destined for the other) to produce enhanced-integrity outbound symbol streams with occasional content modification—overall, permitting the upstream and downstream components to communicate reliably (e.g., meeting specified bit error rate) over otherwise impracticable distances.

For purposes of example and clarity of explanation, signaling paths 102, 104 and driver/receiver ports within retimer 101, upstream component 103, and downstream component 105 (i.e., downstream port of component 103, upstream port of component 105 and upstream/downstream pseudo ports of retimer 101, as shown) are assumed to implement a configurable number of communication channels in accordance with a Peripheral Component Interconnect Express (PCIe) communication specification and are thus described in the terminology of that specification. Accordingly, upstream component 103 may be a root complex or switch and the downstream component 105 may be an endpoint or switch, and the N bidirectional signaling "lanes" 107 that constitute the physical signaling media within each of paths 102 and 104 may be organized into a configurable number of communication channels between a given pair of components (i.e., upstream component and retimer or downstream component and retimer). For example, in a fully/maximally aggregated configuration, all N lanes (each implemented by a dedicated differential signaling pair for each signaling direction as shown at 107) are aggregated to form a single PCIe link with individual data blocks striped across the N lanes. Conversely, each of the N lanes may each be operated as a distinct and independent PCIe link (i.e., through which a serial stream of data blocks is conveyed) in a minimally aggregated or non-aggregated configuration, and in aggregation configurations between those two extremes, two or more PCIe links are implemented by respective lane aggregations (e.g., two links of N/2 lanes each; four links of N/4 lanes each, 8 links of N/8 lanes each, etc.).

In an embodiment shown in detail view 121, data-logging retimer 101 is implemented by media controllers 125, memory 127, aggregation engine 129 and host interface 110, together with physical media attachment (PMA) and physical coding sublayer (PCS) blocks 135 for each lane on both upstream and downstream pseudo ports. Referring to the example in detail view 140, each PMA/PCS block 135 includes an input deserializer 151 that converts a 32 Gbps (32 gigabits per second) serial data stream received via a differential signaling pair into a 1 GHz stream of 32-bit wide data words, outputting that 1 GHz stream to PCS 153 which, in turn, reverses a 128b/130b encoding to produce a stream of 128 bit blocks (e.g., output in four successive sets of 32 bits at 1-nanosecond unit intervals). An interface 155 implemented by a set of data input/output registers and related circuitry according to a PIPE (Physical Interface for PCI Express) specification, registers the decoded data stream at the input of the corresponding media controller. Though not specifically shown, each PMA/PCS block 135 may also perform clock recovery (i.e., synthesizing a clock based transitions in the incoming data stream on each lane), produce framing signals (i.e., marking the boundary of each 128-bit "data block" or "ordered set" block) and others, outputting the recovered clock, block-framing signal and others (e.g., various receiver/transmitter status signals) for consumption by the corresponding media controller via PIPE interface 155. Also, a clock selection circuit is provided in a number of embodiments to select, in accordance with the lane aggregation configuration, one or more operating clocks from among the multiple clocks recovered from constituent PCIe lanes of a given link—the one or more operating clocks to be applied within the media controllers and transmit path within the counterpart PCS/PMA blocks in the downstream or upstream direction.

Still referring to the PMA/PCS example at 140, an outbound PIPE interface 161, PCS 163 and serializer 165 perform essentially reverse operations to those of the input signal path—i.e., registering signals from the corresponding media controller, 128b/130b-encoding the 128-bit block stream to produce an outbound 130-bit block stream and then serializing the 32-bit-wide 1 GHz encoded block stream for 32 Gbps transmission on the outbound differential pair of the subject PCIe lane. In one embodiment, the aforementioned data-recovered clock (and/or derivations or subdivisions thereof) is applied within the deserializer, 130b-to-128b PCS and output PIPE, while a clock recovered from a corresponding downstream PCS/PMA block is applied within the input PIPE, 128b/130b PCS and serializer—an approach that avoids the complexity and latency penalty of a plesiochronous clock domain crossing in a given data flow direction. Other clocking architectures may be used in alternative embodiments.

Aggregation engine 129 communicates with media controllers 125 (each of which is dedicated to two PCIe lanes (×2) in the depicted example—there may be more or fewer dedicated lanes per controller in alternative embodiments) via a set of controller-shared buses 171 to coordinate media controller activities as necessary to implement various lane-aggregation configurations. The aggregation engine may additionally communicate with the upstream and downstream PMA/PCS blocks 135 (e.g., to trigger reset and/or calibration operations, control block framing, etc.) and may also execute read/write accesses to retimer memory 127 (connection not shown). Though shown as a unified/shared resource, retimer memory 127 may be implemented by multiple discrete memory installations (e.g., one installation per media controller) with each discrete or unified memory constituted by various different types of storage (e.g., volatile and nonvolatile memory). Also, retimer memory 127 (or component memories thereof) may be multi-ported to support simultaneous (or arbitrated) access from multiple requestors, including media controllers 125 as well as host interface 110. Alternatively, a shared memory control component may be implemented within retimer 101 to read from and write to retimer memory 127 in response to requests from various sources, including the media controllers 125 and host interface 110.

Still referring to FIG. 1, each media controller 125 includes one or more microcontrollers 181 (which may in all cases instead be a general purpose processor, special-purpose processor or any other practicable instruction processor) together with a nonvolatile (and/or volatile) code storage 183 and lane-dedicated "offload" circuitry 185, the latter implementing critical-path circuitry through which mission-mode data (arriving via a given PCIe lane) propagates and is subject to occasional modification for link control purposes. While a single microcontroller 181 manages mission-mode data flow in both path directions (from upstream pseudo-port to downstream pseudo-port and vice-versa) in the depicted example and embodiments discussed below, separate/counterpart microcontrollers (with separate or shared code storage 183) may be provided in all cases to interact with the PCS/PMA and offload circuitry for respective data flow directions. In any case, microcontroller 181 responds to various signals supplied from the PMA/PCS circuitry and offload circuitry (including various status signals generated in response to requests issued by the microcontroller as well as mission-mode data and clocking signals extracted from the mission-mode data stream) by transitioning state variables between predefined states (e.g., transitioning a PCIe link state variable between various PCIe link states) and executing numerous link management functions, writing/reading various run-time variables to/from memory 127 as part of those control/management operations. Examples of information received/derived by a given microcontroller in connection with link operation and management include, without limitation, status signals from PMA/PCS blocks 135 (e.g., receiver/transmitter status, clocking status, electrical-idle detect, etc.), link-state information received and/or derived from physical-layer packets (e.g., PCIe-defined Ordered Sets), internal state data (e.g., status of deskew and/or other link management operations), and event data of various types (e.g., generated in response to detection of hardware and/or logical events), and may more specifically include (for example and without limitation) the following or signals/information indicative thereof:

warm reset (from dedicated pin of retimer IC)
    hot reset (signaled by PCIe ordered set)
    time-interval elapse (e.g., reset wait complete)
    receiver detect start (e.g., detecting current draw from termination applied within remote receiver)
    receiver detect complete
    polarity status (confirming correct or inverted data polarity over given lane)
    deskew-ready (internal state triggered by signal from aggregation engine)
    deskew marker detect (internal state triggered by detection of deskew marker within link data flow)
    deskew finish (deskew markers detected in all lanes of a link)
    ready to forward (internal state)

electrical idle detect (detecting lack of incoming data on one or both paths of a lane for a given time interval)

In one embodiment, the controller(s) 125 for a given logical link (i.e., aggregation of PCIe lanes) execute state/event/data logging with respect to that logical link (and constituent data lanes thereof), storing logging data and related status within memory 127 in accordance with logging control directives supplied via host interface 110. In a more specific implementation, shown in detail view 201, a pre-allocated region of memory 127 is reserved to enable host-controlled state/event/data logging for each instantiated logical link (there may be a variable number of logical links according to retimer aggregation configuration), with each such allocation providing for storage of a logging control data structure 203, logging status data structure 205 and logging memory 207 (logging buffer) for the subject link. A host component (which may be, for example, the PCIe root complex or possibly an alternative host component) issues logging commands via host interface 110 (e.g., relatively low-bandwidth serial interface such as I2C, I3C, JTAG, etc.) to store logging-control directives within the logging control data structure 203 (for a given link) and to read logging status information (205) and logging buffer contents (207). At least one of the logging control directives selectively enables information logging at strategic execution points within the mission code—sequences of programmed instructions and related control values (e.g., stored within code store 183) executed by link microcontroller(s) 125 to manage and operate the PCIe link and shown, for example, at 220 to include a number of different operational sequences including, for example and without limitation, an retimer initialization/link recovery sequence 221 (executed during retimer startup or in response to certain reset events), an event loop 223 (execution of event-triggered code sequences or "handlers" 224 in response to affirmative detection of iteratively evaluated conditions ("events" 225)), and interrupt handler code sequences 227 executed in response to hardware and/or software interrupts. Within each of those components of the mission code architecture (i.e., initialization/recovery, event loop and interrupt handlers), individual code sequences may be viewed, conceptually at least, as branch-connected blocks of code 230, each having a one or more operational sequences 231, an optional decision/branching point 233 and one or more logging function calls 235 ("L"), execution of the latter triggering/invoking logging function execution.

Figure 2:
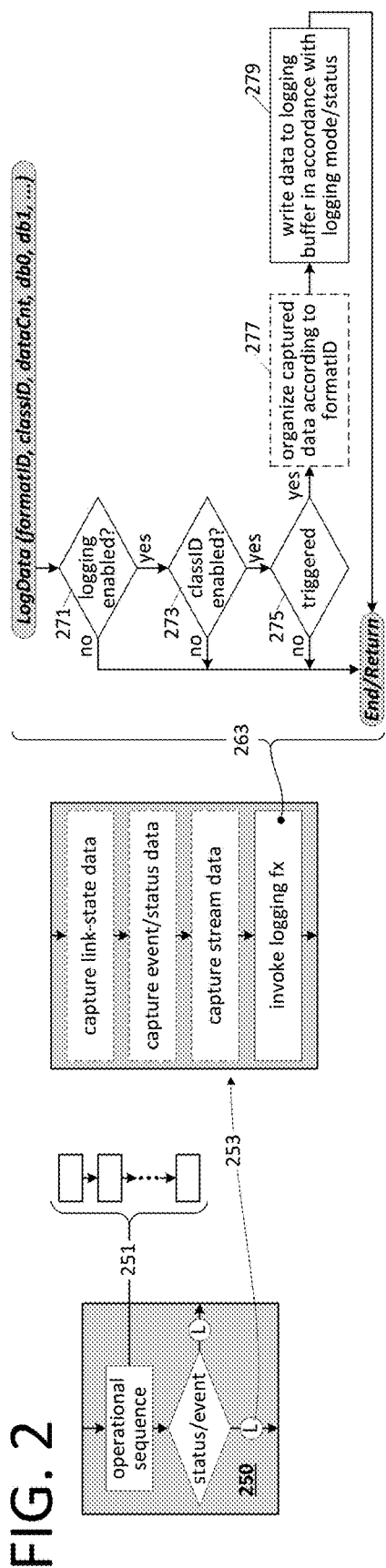
FIG. 2 illustrates an exemplary code block 250 (corresponding to those shown in FIG. 1) having an operational sequence, status/event determination branch and logging function calls at each possible branch direction.

FIG. 2 illustrates an exemplary code block 250 (corresponding to those shown in FIG. 1) having an operational sequence, status/event determination branch and logging function calls at each possible branch direction (either or both logging function calls may be omitted where the branching decision and/or information generated/obtained in operational sequence are deemed not to warrant data logging). In one embodiment, various link-state data event/status data and/or stream data—collectively referred to herein as "logging information"—is obtained and/or generated by a link microcontroller during execution of the operational sequence (i.e., during operations shown at 251) and then, upon branching to a code point having an embedded logging function call, that logging information is captured (253) in the form of logging function arguments (or within one or more data structures pointed to by logging function argument(s) in a pass-by-reference implementation) and thereby passed to the logging function together with predetermined a format identifier (formatID), classification identifier (classID) and argument count (dataCnt), the latter indicating the number of arguments passed by value or reference to the "LogData" logging function (i.e., a function call with a variable-length argument list). In one embodiment, shown at detail view 263 of FIG. 2, the logging function code is executed by the link microcontroller or a dedicated data-logging processor (or sequencer or state machine, etc.) to implement a logging engine that determines whether data logging is enabled generally for the subject PCIe link and, if so (affirmative determination at 271) and whether the incoming (argument-passed) classification identifier is enabled—determinations made in accordance with host-supplied control information within the logging control data structure. If logging is enabled and the classification identifier is also enabled (affirmative determination at 273 for the latter), the logging engine determines whether any predefined logging trigger condition is met and if so (affirmative determination at 275, again in accordance within host-supplied control value(s) stored within the logging control data structure), the logging engine optionally organizes data in accordance with the format ID (277) and then writes the logging data to the logging buffer in accordance with logging mode and status (i.e., according to fields within the logging control and logging status data structures, respectively) at 279.

Figure 3:
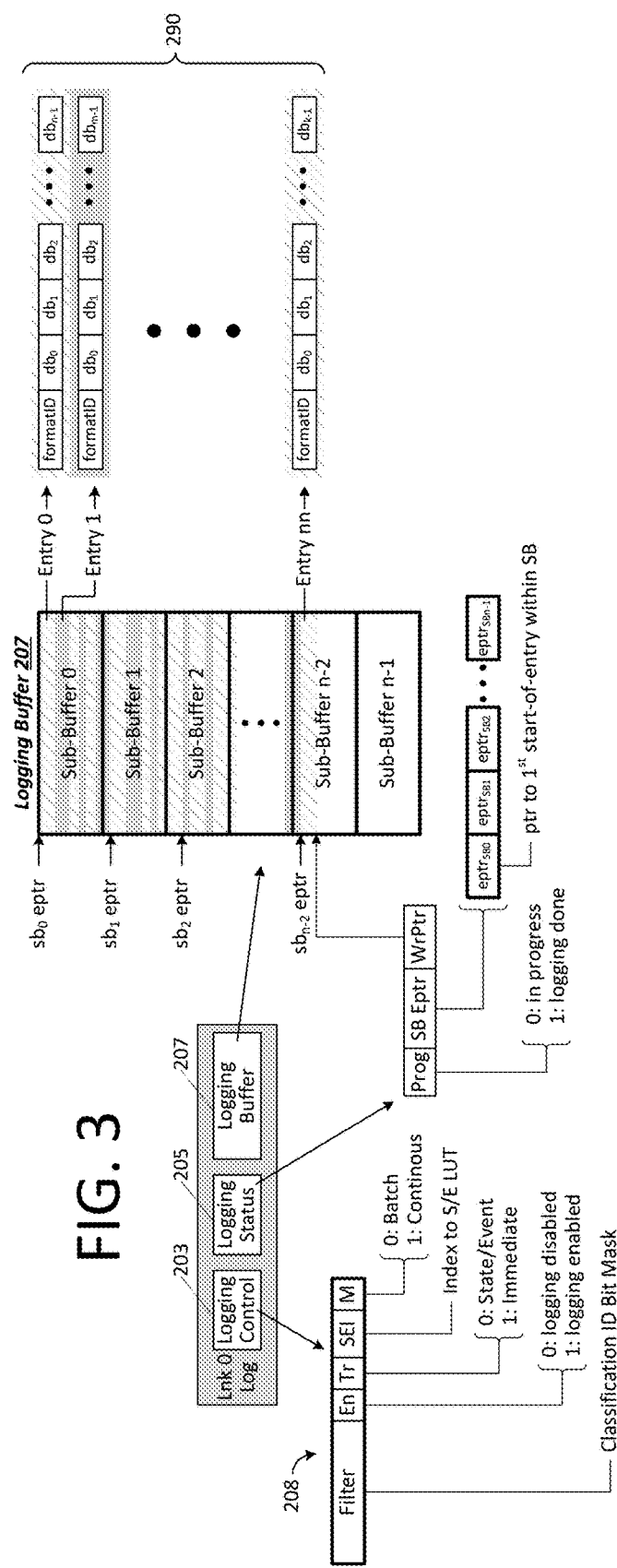
FIG. 3 illustrates more detailed embodiments of the per-link logging control data structure, logging status data structure and logging buffer shown within the FIG. 1 logging-memory allocation.

FIG. 3 illustrates more detailed embodiments of the per-link logging control data structure, logging status data structure and logging buffer shown within the FIG. 1 logging-memory allocation (i.e., at 203, 205 and 207, respectively). In the depicted example, logging control data structure 203 includes logging filter ("Filter"), log-enable ("En"), trigger-type ("Tr") and logging-mode ("M") control fields together with a state/event index field ("SEI")—fields collectively shown at 208 and referred to herein as a logging control vector (LCV). The log-enable, trigger-type and logging-mode fields are single-bit fields that, respectively, enable or disable logging altogether (log-enable), specify an unconditional or conditional logging trigger (trigger-type) and select between single-batch and continuous logging data storage (logging mode). More specifically, the host (via the host interface discussed above) may set the log-enable field to either a logic '1' or '0' to enable or disable information logging for the subject PCIe link (or at least for one data flow direction within the PCIe link) yielding an affirmative or negative determination, respectively, at decision 271 in FIG. 2. The host may similarly write a logic '1' or '0' value into the trigger-type field to effect either (i) unconditional ("immediate") triggering in which data logging is commenced immediately upon logging function entry without dependency on events and/or status or (ii) conditional ("state/event") triggering in which a particular set of event(s) and/or state are to be confirmed (extant) before commencing data logging. In the depicted embodiment, the relevant states/events that trigger (enable) data logging are determined by indexing a state/event lookup table (LUT) using the host-supplied state/event index. As discussed below, the host may write to the state/event LUT (implemented, for example, within the logging memory allocation or elsewhere) to predefine various combinations of states and events of interest and then later simply update the state/event index within the log control data structure to effect, as the logging trigger, an arbitrarily complex combination of states and/or events.

In one embodiment, a bit-mask is stored within the filter field of the logging control data structure (i.e., in response to reception of that mask or numerically-encoded value corresponding thereto from the host) to selectively enable logging with respect various classification identifiers—in effect providing a fine-grained log-enable to the host as the host may disable all but a single classification ID of interest (or any set of classification IDs of interest or all classification IDs). In one implementation, for instance, the filter value constitutes a bit-mask to be logically ANDed with the classification identifier supplied to the data logging engine (i.e., passed by reference or value in each individual logging function call) and thus enable determination whether that classification ID is or is not enabled for data logging purposes.

Still referring to the FIG. 3 logging-control structure, the logging mode field specifies whether information logging is to proceed (i) continuously until stopped by the host, with storage into the logging buffer wrapping (overflowing) as necessary, or (ii) proceed until the logging buffer is full and automatically stopping at that "single batch captured" point. The logging status data structure 205 includes a set of fields to support these alternate logging modes, including a write pointer or write offset field ("WrPtr") that points in either mode to the next-to-be-written location within logging buffer 207, together with mode-specific logging progress and sub-buffer entry-pointer fields ("Prog" and "SB Eptr," respectively). During batch mode logging (LogCtrl.M=0), the logging progress field indicates whether log buffer space remains (and thus logging is ongoing/in-progress) or the log buffer has been filled (logging done/complete). During continuous-mode logging, the sub-buffer entry pointer fields are used to mark, for each of a number of logical sub-buffers (constituent portions of the logging buffer), the location of the initial valid logging entry within that sub-buffer and thus enable host-side parsing of the logging buffer despite logging data overflow (as continuous-mode logging may overwrite logging buffer 207 one or more times over before being read by the host). As explained in further detail below, when the logging control data structure specifies continuous logging mode, the logging engine ascertains, at the start of each logging-entry storage, whether an entry pointer has been recorded for the sub-buffer pointed to by the write pointer and, if not, recording the write pointer (or at least a sub-buffer offset portion thereof) as the sub-buffer entry pointer. During logging-buffer read out, the logging buffer contents are returned to the host together with the write pointer and sub-buffer entry pointers, the latter permitting the host to determine logging start and ending points despite the continuous-mode (wrap-around) information logging.

In one embodiment, individual logging entries are stored within the logging buffer in a highly compact format that includes the format identifier supplied in the logging function invocation (a value known to the host to predefine a particular logging entry content and format) followed by the logged data. Examples for respective entries are shown at 290, with entry 0 containing the format ID for that entry followed by 'n' data bytes, entry 1 containing a format ID followed by 'n' data bytes and so forth.

Figure 4:
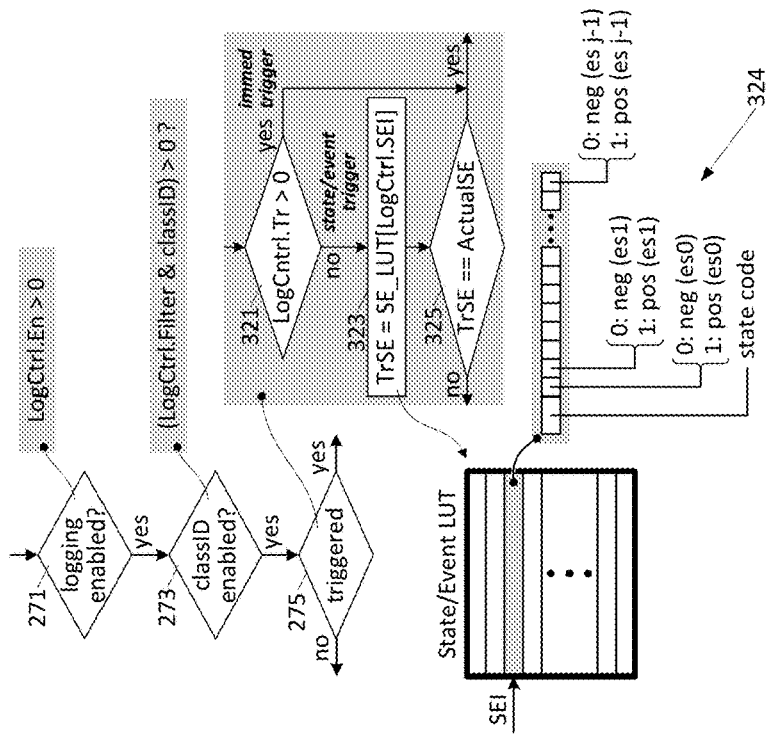
FIG. 4 illustrates the exemplary logging/no-logging decision tree of FIG. 2 in the context of the FIG. 3 logging control data structure.

FIG. 4 illustrates the exemplary logging/no-logging decision tree of FIG. 2 (operations 271, 273, 275) in the context of the FIG. 3 logging control data structure. As shown, the logging engine evaluates the logging-enable field to determine whether logging is generally disabled or enabled, and performs a bitwise logical AND of the logging control filter field (LogCtrl.Filter) and incoming classification identifier (i.e., parameter supplied by reference or value to logging control function) to determine whether the particular logging function class is enabled. If affirmative results at 271 and 273 and the logging-control trigger field (LogCtrl.Tr) is nonzero, indicating immediate trigger, the overall logging decision is affirmative and information logging is executed as discussed in FIG. 2. Otherwise, if the trigger field specifies state/event logging (negative decision at 321), a state/event look-up table is indexed (using the state/event index, SEI, recorded within the logging control data structure) at 323 to obtain a state/event vector corresponding to host prescribed logging conditions. In one embodiment, for example, the vector is a tuple of a link-state code (e.g., a two or three bit code to encode possible link states), and a set of event/status values that correspond to respective event occurrences and/or status (i.e., each value being a bit that is set to affirm occurrence/existence of the corresponding event/status ("es") and reset otherwise)—an arrangement shown for example at 324. At 325, the indexed state/event vector is compared with a state/event value indicative of instantaneous state/event ("ActualSE")—a value or set of values maintained by the link microcontroller(s) and made globally available or passed-by-parameter to the logging function—proceeding or not proceeding with data logging according to actual state/event value matches the trigger requirement.

Figure 5:
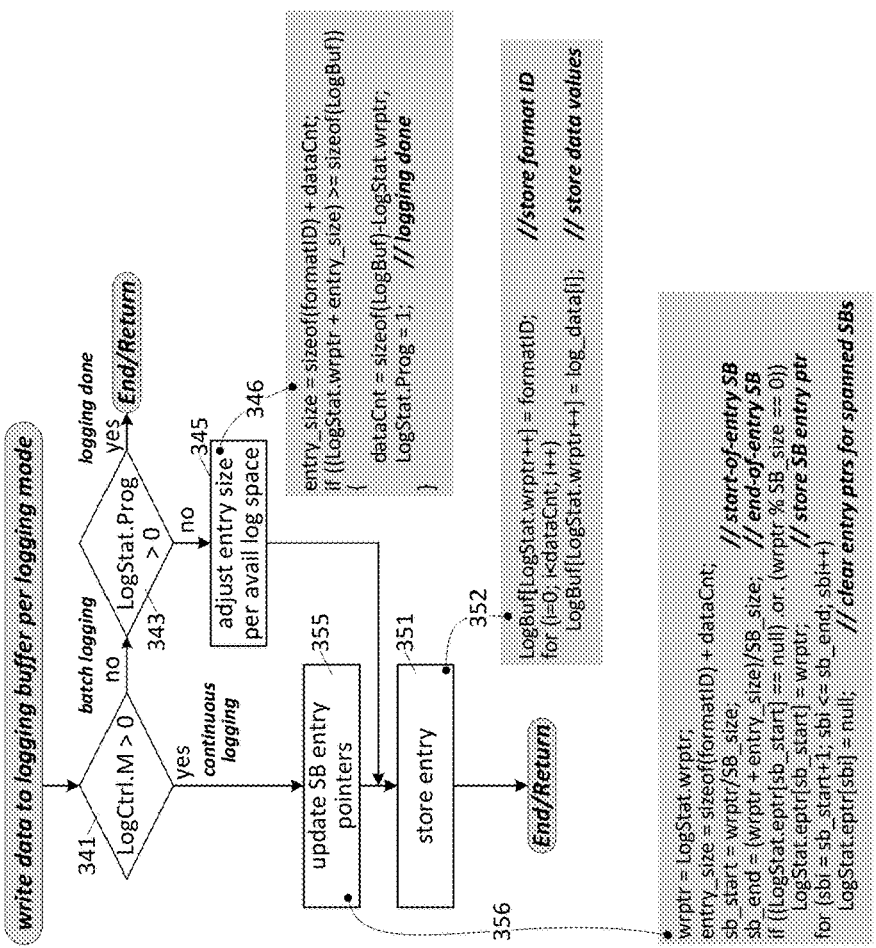
FIG. 5 illustrates an exemplary logging-buffer write operation implemented by the FIG. 2 logging engine.

FIG. 5 illustrates an exemplary logging-buffer write operation implemented by the FIG. 2 logging engine (i.e., operation 279). At 341, the logging engine evaluates the logging-mode field of the logging control data structure to determine whether the host has specified batch or continuous logging mode. If batch logging (i.e., fill the logging buffer and then stop), the logging engine evaluates the logging progress field of the logging status data structure at 343. If the logging buffer is full (i.e., LogStat.prog is nonzero), the buffer is full and no information logging is carried out. If the logging buffer is not yet full (negative determination at 343), the logging engine adjusts the logging entry size (i.e., total amount of information to be recorded within the logging buffer in the current logging function call) in accordance with remaining logging-buffer capacity at 345. A pseudo-code example of this operation is shown at 346, starting with determination of the entry size (sum of the formatID size and the data count), followed by determining whether the current logging entry will span to or beyond the end of the logging buffer (i.e., adding the write pointer field of the logging status structure to the entry size and comparing the sum to the size of the logging buffer) and, if so, then (i) revising the data count (e.g., number of data bytes to be written into the log buffer) as necessary to avoid writing beyond the end of the logging buffer and (ii) setting the logging progress field of the logging status structure to "logging done." After conditionally adjusting the entry size at 345, the logging engine stores the entry within the logging buffer at 351. Per pseudocode example at 352, the logging engine stores the format ID within the logging buffer at the current write pointer location and increments the write pointer afterward (i.e., "LogBuf[LogStat.wrptr++]=formatID"). After storing the formatID, the logging engine stores each of the data items (organized within a "log_data" array) in successive log buffer locations, iteratively advancing the write pointer following storage of each item so that the write pointer continues to point to the next-to-be-written log buffer location.

In a continuous logging operation (affirmative determination at 341), the logging progress evaluation and conditional entry-size adjustment (operations at 343 and 345) are bypassed in favor of sub-buffer entry pointer update at 355. More specifically, per the pseudocode example at 356, the logging engine determines the sub-buffer span of the to-be-written entry, setting the start-of-entry sub-buffer index (sb_start) to the current write pointer integer-divided by sub-buffer size, and setting the end-of-entry sub-buffer index (sb_end) to the sum of the current write pointer and entry size, dividing that sum by the sub-buffer size. If the entry pointer for the starting sub-buffer is null ("LogStat.eptr[sb_start]==null") or the write pointer points to the start of a sub-buffer (i.e., "wrptr % SB_size==0", where '%' is the modulus operator—meaning that the previously stored message ended at a sub-buffer boundary), the logging engine sets the entry pointer for the starting sub-buffer to the current write pointer and thus to the starting location of the newly (yet-to-be) written entry. The logging engine then clears (nulls) the entry pointers for all remaining sub-buffers spanned by the new entry (i.e., "LogStat.eptr[sbi]=null," incrementing sbi from sb_start+1 to sbi_end), and then writes the new entry into the log buffer at 351 as discussed above.

FIG. 6 illustrates an exemplary host interface 380 implemented within the retimer (e.g., as shown at 110 in FIG. 1) to enable host read/write access to the logging control/status data structures and logging buffer. In the depicted example, receiver/transmitter circuitry 381, 383 (coupled via pad 385 to a host-connected signaling line—there may be multiple pads/signaling lines in alternative multi-wire bus implementations) implements serial input/output (I/O) in accordance with any standard or proprietary signaling specification/protocol (e.g., JTAG, I2C, I3C, etc.) by shifting inbound and outbound data sequences (including instructions, operands, etc.) into and out of a command buffer 387 and output buffer 389, respectively. The link microcontroller 181 (or microcontrollers) retrieves host commands and associated operands from the command buffer and, when directed (by host command) loads status and/or logging information into the output buffer for return to the host. Though depicted as having a direct connection to the command/output buffers, the link microcontroller(s) may instead interface those buffers indirectly via a dedicated link controller (e.g., a processor, sequencer, state machine etc. that implements a logical serial interface in accordance with a standardized or proprietary protocol).

In an exemplary implementation shown at 401, each incoming host command (or directive) contains an operation code ("Op") specifying one of at least four logging-related operations, a link identifier (LinkID) that specifies one or more PCIe links to which the operation-code is directed, and optional write value. Where separate per-flow-direction information logging is implemented, one or more additional fields (or a portion of the linkID field) may specify whether the operation code is directed to the downstream or upstream flow (or both). In the depicted example, the four logging-related commands include directives to (i) write to logging control data structure (i.e., store a log control vector (LCV), for example as shown at 208 in FIG. 3), (ii) write to state/event LUT (e.g., structure as shown in FIG. 4), (iii) read from logging status data structure, and (iv) read from logging buffer. In a write to logging control data structure, a logging control vector is supplied in the write-value field of the incoming command and stored within the logging control data structure of the linkID-specified link. Note that the host may rewrite the entire logging control vector in each write to the logging control data structure or may specify individual subfields that are to be updated without affecting others (i.e., masking one or more fields within the logging control data structure from being overwritten). When the operation code specifies a write to the state/event LUT, the write value contains the state/event vector (e.g., as shown at 324 in FIG. 4) and a state/event index, the latter specifying a location within the state/event LUT at which the state/event vector is to be stored. As the host interface (380) permits the host to write both the state/event vector and the LUT index at which the vector is stored, the host is effectively aware of the state/event LUT storage (and may maintain a local image thereof) and thus may later program the logging control data structure with successive state/event indices corresponding to host-specified combinations of states/events of interest. Continuing with the logging related command protocol, when the operation code specifies a logging status read or logging buffer read, the write value field may be unused and thus may be omitted from the host transmission and/or ignored by the retimer logging engine.

FIG. 7 illustrates an exemplary sequence of operations executed within the retimer logging engine (e.g., implemented by a processor/state-machine circuitry and/or link microcontroller(s)) in response to incoming host commands, beginning with a logical switch or branch (420) to one of multiple operational sequences according to the Op field of a given command. In the case of an update/write to the logging control data structure (update log control, Op=00), the logging engine writes the logging control vector (conveyed in the WriteVal field of the incoming directive) to the logging control structure for the specified link as shown at 421. Similarly, in the case of a command to update/write to the state/event LUT (update S/E LUT, Op=01), the logging engine writes the state/event vector (conveyed in the WriteVal field) into the state/event lookup-table for the specified link and at the command-specified state/event index (also conveyed in the WriteVal field) as shown at 423. The logging engine responds to a log-status read command (op code '10') by transferring the contents of the linkID-specified logging status data structure to the host interface (e.g., loading into output buffer 389 of FIG. 6) as shown at 425 and initiating transmission of that content to the host. Similarly, in the case of a host command to read the logging buffer for a given link (Op=11), the logging engine transfers the contents of the logging buffer to the host interface (an iterative operation in an embodiment in which the logging buffer is substantially larger than the host-interface output buffer) for transmission to the host as shown at 427 and then resets the write pointer, sub-buffer entry pointers and progress fields of the linkID-specified logging status data structure at 429, effectively resetting the log buffer and logging status to make ready for subsequent data logging. A pseudo-code example of this latter operation (resetting/clearing pointers and write-progress field) is shown at 430.

FIG. 8 illustrates a sequence of operations that may be implemented within a host-side controller to manage data logging within the retimer and retrieve logged data. Starting at 451, the host controller writes a log control vector to the retimer (e.g., transmitting an opcode, link identifier and log control vector in accordance with the logical command structure shown in FIG. 6), optionally delays for a predetermined or event-driven interval at 453, and then reads the logging status at 455 (transmitting an op code that specifies a logging status read and link ID). If batch-mode logging was specified in the most-recently transmitted log control vector (i.e., the LCV written at 451)—affirmative determination at 457—then the logging status is evaluated at 459 to determine whether the requested data logging is complete (i.e., whether LogStat.Prog is nonzero as shown at 461—note that structure LogStat may be indexed by a linkID value, not shown). If batch-mode logging is complete (affirmative determination at 459), the host controller reads the log buffer at 463 (again, transmitting the corresponding op code together with a link identifier). If batch-mode logging is not yet complete, the host controller may iteratively repeat the delay, status read and status check operations (453, 455, 457, 459, or at least the logging-done inquiry at 459) until logging is complete.

If continuous-mode logging was specified in the most-recently transmitted log control vector (i.e., negative determination at 457), the host issues a log buffer read at 463 to retrieve whatever log contents are available. In one embodiment, the retimer logging engine completes any in-progress entry-logging prior to responding to a logging buffer read (e.g., completing the entry storage and status update prior to executing the operations shown at 427 and 429 in FIG. 7) so as to avoid loss of coherency between log buffer contents and logging status.

FIG. 9 illustrates exemplary host-side parsing (unpacking) of entries stored in a batch-mode data log obtained from the retimer (i.e., log buffer read as shown at 463 in FIG. 8). At 481, the host controller initializes an unpack pointer ("ptr") to the start of the log (i.e., starting address of the data log within host memory). Entries within the data log—shown for example with their respective starting points at 482—are then iteratively unpacked by (i) retrieving the format identifier (ID) for the current ($i^{th}$) entry at 483, (ii) indexing a host-side dictionary using the format ID to determine the entry length and format of entry content at 485, and (iii) unpacking the entry contents into one or more host variables at 487 in accordance with the entry format, advancing the unpack pointer to the end of entry according to the entry length. After each iteration of the entry-unpack sequence (483, 485, 487), the unpack pointer is evaluated at 489 to determine whether the end of the data log has been reached. If not (negative determination at 489), the entry-unpack sequence is repeated for the next logged entry followed by reevaluation of the unpack pointer at 489.

FIG. 10 illustrates an exemplary host-side parsing/unpacking of entries stored in a continuous-mode data log obtained from the retimer. Starting at 501, an unpack pointer ("ptr") is initialized to an initial entry in the data log, and the span (size) of valid content within the data log is recorded within a "valid_log" variable—operations shown in greater detail in the pseudocode example at 502. More specifically, the unpack pointer is initialized to the initial entry in the data log by identifying the last/final sub-buffer in the data log (e.g., dividing the write pointer obtained in the logging status read at 455 in FIG. 8 by the sub-buffer size) and then, proceeding sub-buffer by sub-buffer from that end-of-valid-log sub-buffer to the immediately preceding sub-buffer (with modulo wrap-around as necessary per modulus operation '%' shown in pseudocode 502), assigning the first non-null sub-buffer entry pointer as the starting value of the unpack pointer. The valid size of the data log is determined by difference between the unpack pointer (first valid entry pointer) and write pointer, and more specifically the difference between those two pointer values according to which of the two logging scenarios shown at 505 and 507 is indicated by the relative values of the unpack pointer and write pointer. In scenario 1 (505), the valid log extends from the first entry pointer to the write pointer without wrapping around the end of the log buffer (i.e., the unpack pointer is less than the write pointer) so that the valid log size is the difference between those two pointer values ("valid_log=wrptr−ptr"). Conversely, in scenario 2 (507), the valid log wraps around the end of the log buffer to reach the write pointer (i.e., the unpack pointer is greater than the write pointer) so that the valid log size is the difference between the unwrapped write pointer (wrptr plus log-buffer size) and the unpack pointer (i.e., "valid_log=wrptr+sizeof(log)−ptr").

Still referring to FIG. 10, after initializing the unpack pointer to the initial log entry and setting the valid log size, entries are iteratively unpacked at 509 (i.e., executing the same unpack sequence as shown at 483, 485, 487 in FIG. 9, but using a modulo version of the unpack ptr: "ptr % sizeof(log)") until the unpack pointer reaches the end of the valid log (affirmative determination at 511).

FIG. 11 illustrates an exemplary retimer event history reconstructed by the host based on information logged within the retimer per host-specified logging control vector and transmitted via the host interface in response to host readout request/command. At time 0, the retimer detects signal assertion at a system-connected reset pin (e.g., a PERST pin in a PCIe implementation). An interrupt is signaled to the two microcontrollers that respectively manage the upstream path and downstream path for a given pair of lanes. Both microcontrollers reset their mission control state machine to "RESET START" state and reset their state transition timers. Both microcontrollers log the first logging entry into their logging buffer with following data:

1. formatID==state_info_ID.
2. first logging data==state transition timer value of 0.
3. state info="RESET START"

When the system de-asserts the reset signal (e.g., PERST), circuitry within the retimer raises an interrupt to both microcontrollers to notify those microcontrollers of that event. The mission control state machines of both paths transition into "RESET WAIT COMPLETE" state which triggers another timed state logging with elapse time==0.1 ms and state="RESET WAIT COMPLETE". Each mission control state machine independently prepares various components in its path, including the PMA/PCS blocks 135 depicted in FIG. 1, to start the normal link up operation. When all the components of the path are ready the mission control state machine of the path transitions itself through RX DETECT START, RX DETECT COMPLETE, RX VALID DETECTED, READY TO DESKEW, DESKEW FINISH, all the way to FORWARD state, by operating various parts of the path to perform the tasks for the state and checking the status to determine the state transitions. each state transition triggers a timed state logging into the logging buffer.

For a successful link up flow, after reaching FORWARD state, both paths are to remain in that state to negotiate the next operation. The result of that negotiation may be to stay in the current state and keep transferring data at the current signaling rate, or to transition to a higher signaling rate. The exemplary FIG. 11 data-log shows, however, that both paths stayed in FORWARD state for approximately 20 ms and then transitioned to a DETECTED ELECTRICAL IDLE state—indicating that both paths stopped sending data and thus a failed link up (failure to bring up link).

The cause of link bring-up failure is not readily apparent from either the upstream or the downstream data log alone (i.e., each showing state transitions for a respective signaling direction). Both paths detect the RX of their peer (upstream or downstream link component) successfully at RX DETECT COMPLETE state. Both paths detect valid data streams in RX VALID DETECTED state. And both paths successfully forward data streams to their counterparts in FORWARD state.

But the timestamped state transitions within the two logs enables a side-by-side (temporally correlated) comparison that readily reveals the source of bring-up failure. After the RX detection, the upstream endpoint starts data transfer within 10.4 ms, but the downstream endpoint takes 35.2 ms to start data transfer after RX detection. This means the upstream path reaches the FORWARD state 24.8 ms earlier than the downstream path. Based on PCIe protocol, the upstream endpoint will time out if no valid response from the root complex is received within 24 ms after data transfer.

Based on the timed state logging, the re-constructed sequence of events becomes clear:

1. After PERST, both paths reach RX DETECT COMPLETE state roughly at the same time.
2. Then upstream path reaches FORWARD state first. continuously transferring data for 24 ms. During that time period, upstream is still in RX VALID DETECTED state and never transfer valid data to the endpoint. After 24 ms the end point times out and stops transferring data, causing upstream retimer path transitions into DETECTED ELECTRICAL IDLE state.
3. After the upstream mission control state machine reaches DETECTED ELECTRICAL IDLE state, downstream path arrives at FORWARD state and continuously transferring data for 24 ms. But at this time, upstream path is already in DETECTED ELECTRICAL IDLE state and no data is sent to the root complex. Failed to detect the valid data from the end point, the root complex times out after 24 ms, causing downstream goes into DETECTED ELECTRICAL IDLE state.

Accordingly, based on this analysis of the temporally correlated upstream and downstream data logs, downstream RX detection operation is identified as the root cause of the failed link up.

Referring to FIGS. 1-11 generally, one or more programmed microcontrollers and/or dedicated hardware circuits (e.g., finite state machines, registered or combinational circuits, etc.) may be provided to implement and/or control all or part of the various architectural and functional elements within the retimer architectures presented herein (e.g., to implement any one or more of the lane controllers, aggregation engine, logging engine and/or circuitry within the host integrated circuit component that interacts with the lane controllers, aggregation engine or logging engine. Additionally, any or all of those architectural/functional elements (including the entirety of a data-logging integrated-circuit architecture according to embodiments herein, with the data-logging retimer architecture being but one such example) may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media).

When received within a computer system via one or more computer-readable media, such data and/or instruction-based expressions of the above described circuits can be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply specific details not required to practice those embodiments. For example, the various signaling rates and related frequencies, lane counts, path widths, block sizes, encoding/decoding schemes, lane aggregation/segmentation options, logging data structures, host interface types, data-unit sizes (e.g., bytes) and so forth are provided for purposes of example only—any practicable alternatives may be implemented in all cases. Similarly, signaling link parameters, protocols, configurations may be implemented in accordance with any practicable open or proprietary standard (PCIe being but one example) and any version of such standard. Links or other interconnection between integrated circuit devices or internal circuit elements or blocks may be shown as buses or as single signal lines. Each of the buses can alternatively be a single signal line (e.g., with digital or analog signals time-multiplexed thereon), and each of the single signal lines can alternatively be a bus. Signals and signaling links, however shown or described, can be single-ended or differential. Logic signals shown as having active-high assertion or "true" states, may have opposite assertion states in alternative implementations. A signal driving circuit is said to "output" a signal to a signal receiving circuit when the signal driving circuit asserts (or de-asserts, if explicitly stated or indicated by context) the signal on a signal line coupled between the signal driving and signal receiving circuits. The term "coupled" is used herein to express a direct connection as well as a connection through one or more intervening circuits or structures. Integrated circuit device or register "programming" can include, for example and without limitation, loading a control value into a configuration register or other storage circuit within the integrated circuit device in response to a host instruction (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operational aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated circuit component comprising:
   first and second high-bandwidth interfaces;
   a third interface to receive information-logging commands and output logged information;
   a first logging buffer; and control circuitry to:
forward symbols received via the first high-bandwidth interface to the second high-bandwidth interface for output from the IC component;
receive a first information-logging command via the third interface;
store, in the first logging buffer in response to the first information-logging command, information corresponding to events detected within at least one of the first and second high-bandwidth interfaces in connection with forwarding the symbols; and
output contents of the first logging buffer, including the information corresponding to events detected within at least one of the first and second high-bandwidth interfaces, via the third interface.

2. The integrated circuit component of claim 1 wherein the control circuitry to receive the first information-logging command comprises circuitry to receive a command that selectively enables a plurality of information-logging operations, enabling a first subset of the information-logging operations and disabling a second subset of the information-logging operations.

3. The integrated circuit component of claim 1 wherein the control circuitry to receive the first information-logging command comprises circuitry to receive a command that specifies a predetermined combination of logical states and event occurrences that are required before responding to the information-logging command by storing the information corresponding to events detected within at least one of the first and second high-bandwidth interfaces.

4. The integrated circuit component of claim 1 wherein the control circuitry to receive the first information-logging command comprises circuitry to receive a command that specifies whether storage of the information corresponding to events detected within at least one of the first and second high-bandwidth interfaces is to continue indefinitely or stop after a predetermined quantity of the information has been stored in the first logging buffer.

5. The integrated circuit component of claim 1 wherein the control circuitry to store the information corresponding to events detected within at least one of the first and second high-bandwidth interfaces in connection with forwarding the symbols comprises circuitry to iteratively store the information in respective logging entries within the first logging buffer, including circuitry to store, within each one of the logging entries, a respective format identifier value that indicates a format of information contained within the one of logging entries.

6. The integrated circuit component of claim 5 wherein the circuitry to iteratively store the information in respective logging entries within the first logging buffer comprises a programmed processor to store, within a logging status data structure, values indicating locations, within the first logging buffer, of at least a subset of the logging entries.

7. The integrated circuit component of claim 1 wherein the control circuitry to store the information corresponding to events detected within at least one of the first and second high-bandwidth interfaces in connection with forwarding the symbols comprises circuitry to store information that indicates relative times of occurrence of detected events.

8. The integrated circuit component of claim 1 wherein the control circuitry to store the information corresponding to events detected within at least one of the first and second high-bandwidth interfaces in connection with forwarding the symbols comprises circuitry to store at least a subset of the symbols received via the first high-bandwidth interface.

9. The integrated circuit component of claim 1 wherein the control circuitry comprises one or more programmed processors.

10. The integrated circuit component of claim 1 further comprising a second logging buffer and wherein the control circuitry to forward symbols received via the first high-bandwidth interface to the second high-bandwidth interface for output from the IC component additionally:
outputs the symbols received via the first high-bandwidth interface to a downstream destination via the second high-bandwidth interface;
forwards symbols received via the second high-bandwidth interface to the first high-bandwidth interface for output to an upstream destination; and
stores, in the second logging buffer in response to a second information-logging command, information corresponding to events detected within at least one of the first and second high-bandwidth interfaces in connection with forwarding the symbols received via the second high-bandwidth interface to the first high-bandwidth interface.

11. A method of operation with an integrated-circuit (IC) component, the method comprising:
forwarding symbols received via a first high-bandwidth interface to a second high-bandwidth interface for output from the IC component;
receiving a first information-logging command via a third interface;
storing, in a first logging buffer in response to the first information-logging command, information corresponding to events detected within at least one of the first and second high-bandwidth interfaces in connection with forwarding the symbols; and
outputting contents of the first logging buffer, including the information corresponding to events detected within at least one of the first and second high-bandwidth interfaces, via the third interface.

12. The method of claim 11 wherein receiving the first information-logging command comprises receiving a command that selectively enables a plurality of information-logging operations, enabling a first subset of the information-logging operations and disabling a second subset of the information-logging operations.

13. The method of claim 11 wherein receiving the first information-logging command comprises receiving a command that specifies a predetermined combination of logical states and event occurrences that are required before responding to the information-logging command by storing the information corresponding to events detected within at least one of the first and second high-bandwidth interfaces.

14. The method of claim 11 wherein receiving the first information-logging command comprises receiving a command that specifies whether storage of the information corresponding to events detected within at least one of the first and second high-bandwidth interfaces is to continue indefinitely or stop after a predetermined quantity of the information has been stored in the first logging buffer.

15. The method of claim 11 wherein storing the information corresponding to events detected within at least one of the first and second high-bandwidth interfaces in connection with forwarding the symbols comprises iteratively storing the information in respective logging entries within the first logging buffer, including storing, within each one of the logging entries, a respective format identifier value that indicates a format of information contained within the one of logging entries.

16. The method of claim 15 wherein iteratively storing the information in respective logging entries within the first logging buffer comprises storing, within a logging status data structure, values indicating locations, within the first logging buffer, of at least a subset of the logging entries.

17. The method of claim 11 wherein storing the information corresponding to events detected within at least one of the first and second high-bandwidth interfaces in connection with forwarding the symbols comprises storing information that indicates relative times of occurrence of detected events.

18. The method of claim 11 wherein storing the information corresponding to events detected within at least one of the first and second high-bandwidth interfaces in connection with forwarding the symbols comprises storing at least a subset of the symbols received via the first high-bandwidth interface.

19. The method of claim 11 further comprising receiving a logging-buffer read-out command via the third interface and wherein outputting contents of the first logging buffer via the third interface comprises outputting contents of the first logging buffer in response to the logging-buffer read-out command.

20. The method of claim 11 further comprising:
outputting the symbols received via the first high-bandwidth interface to a downstream destination via the second high-bandwidth interface;
forwarding symbols received via the second high-bandwidth interface to the first high-bandwidth interface for output to an upstream destination; and
storing, in a second logging buffer in response to a second information-logging command, information corresponding to events detected within at least one of the first and second high-bandwidth interfaces in connection with forwarding the symbols received via the second high-bandwidth interface to the first high-bandwidth interface.

21. An integrated circuit component comprising:
first and second high-bandwidth interfaces;
a third interface to receive information-logging commands and output logged information;
a first logging memory;
means for forwarding symbols received via the first high-bandwidth interface to the second high-bandwidth interface for output from the IC component;
means for receiving a first information-logging command via the third interface;
means for storing, in the first logging buffer in response to the first information-logging command, information corresponding to events detected within at least one of the first and second high-bandwidth interfaces in connection with forwarding the symbols; and
means for outputting contents of the first logging buffer, including the information corresponding to events detected within at least one of the first and second high-bandwidth interfaces, via the third interface.

\* \* \* \* \*